(12) United States Patent
Wong et al.

(10) Patent No.: US 9,241,066 B2
(45) Date of Patent: Jan. 19, 2016

(54) SECURE CALL ANALYSIS AND SCREENING OF A SECURE CONNECTION (75) Inventors: Annie Wong, San Jose, CA (US); Shisen Chang, San Jose, CA (US); Robert T. Bell, Bountiful, UT (US); Eddie B. Soliman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2314 days.

(21) Appl. No.: 11/466,343

(22) Filed: Aug. 22, 2006

(65) Prior Publication Data

US 2008/0066152 A1   Mar. 13, 2008

(51) Int. Cl.
*H04L 29/06* (2006.01)
*H04M 3/22* (2006.01)
*H04M 7/00* (2006.01)

(52) U.S. Cl.
CPC ......... *H04M 3/2281* (2013.01); *H04L 63/0428* (2013.01); *H04L 63/30* (2013.01); *H04M 7/006* (2013.01); *H04M 7/0012* (2013.01)

(58) Field of Classification Search
CPC .... H04L 9/0891; H04L 63/04; H04L 63/0272; H04L 63/061; H04L 63/083; H04L 63/0428; H04L 63/30; H04M 3/2281; H04M 7/0012; H04M 7/006
USPC .................. 370/352, 338, 389; 713/153, 171; 709/239; 380/282
See application file for complete search history.

(56) References Cited

U.S. PATENT DOCUMENTS

| | | | |
|---|---|---|---|
| 7,734,908 B1* | 6/2010 | Kung et al. ............... | 713/153 |
| 2002/0124090 A1* | 9/2002 | Poier et al. ............... | 709/228 |
| 2004/0005061 A1* | 1/2004 | Buer et al. ............... | 380/282 |
| 2005/0141706 A1* | 6/2005 | Regli et al. ............... | 380/44 |
| 2005/0144445 A1* | 6/2005 | Yeap et al. ............... | 713/168 |

\* cited by examiner

*Primary Examiner* — Khaled Kassim
(74) *Attorney, Agent, or Firm* — Patterson & Sheridan, LLP (57) ABSTRACT

In one embodiment, a secure computer telephony integration (CTI) connection is established between a call analysis and/or screening device and a call control agent. The call analysis device sniffs secure media packets between the endpoints and receives CTI events from the call control agent via the secure CTI connection. The device correlates the CTI events with the secure media packets, enabling the device to decrypt the packets to perform voice quality troubleshooting or call screening in real-time.

15 Claims, 4 Drawing Sheets

SECURE CALL ANALYSIS AND SCREENING OF A SECURE CONNECTION

BACKGROUND

Streaming communications often employ encryption for security and privacy. A VoIP (Voice over Internet Protocol or Voice over IP) call comprises of one or more media streams. The media is encrypted for a secure VoIP call. The SRTP key material, which can unlock the encrypted media, is present in the call signaling (also known as call control messages), but the signaling is also protected for a secure VoIP call.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, when a secure call is initiated, the call control agent establishes a secure connection, such as a TLS connection, to each of the endpoints for call control message exchange. The call control messages provide the endpoints information like media keying material, IP addresses, and ports; this allows the endpoints to establish connections to each other for the encrypted media communication. In the meantime, a call analysis device establishes an authenticated connection with the call control agent through a computer telephony integration (CTI) interface. The call control agent shares call control information (including the media keying material) to the call analysis device through CTI in the form of CTI events. In addition to receiving CTI events, the call analysis device sniffs the secure media packets sent between the endpoints. The call analysis device correlates the CTI events with the secure media packets to decrypt the media and thus allows for real-time voice quality troubleshooting and/or call screening.

In an embodiment described herein, there is disclosed an apparatus for providing secure call analysis. The apparatus comprises a communication interface for acquiring a secure media packet for a secure call and for receiving a computer telephony integration (CTI) event for the secure call. The apparatus further comprises decryption and correlation logic communicatively coupled to the communication interface configured to correlate the CTI event to the secure media packet and to decrypt the secure media packet with the media keying material contained in the CTI event.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an embodiment described herein, there is disclosed a method for providing secure call analysis. The method comprises receiving computer telephony integration events for a secure media stream comprising a plurality of packets, and correlating the computer telephony integration events to the plurality of packets.

In an embodiment described herein, there is disclosed an apparatus for providing secure call analysis. The apparatus comprises means for acquiring a secure media packet for a secure call while the secure media packet is en route between endpoints of the secure call and means for receiving a computer telephony integration event for the secure call. The apparatus further comprises means for correlating the computer telephony integration event to the secure media packet and means for decrypting the secure media packet with media keying material contained in the telephone integration event.

Still other aspects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention.

DESCRIPTION OF EXAMPLE EMBODIMENTS

Throughout this description, the preferred embodiment and examples shown should be considered as exemplars, rather than limitations, of the present invention. The figures generally indicate the features of the preferred embodiments, where it is understood and appreciated that like reference numerals are used to refer to like elements.

In the example described herein, the call control agent facilitates secure VoIP (Voice over IP) calls. During call setup, the call control agent relays call control messages, including media keying material, to the endpoints via a protected connection (e.g. TLS). Once the endpoints have this info, they can establish connections to each other for the encrypted media (e.g. SRTP) communication. At this point, the secure voice analysis device, which has established an authenticated CTI connection with the call control agent, can receive info about the call in received CTI events, including but not limited to the media keying material for the secure call. The secure voice analysis device also sniffs the secure media between the endpoints, and can thus use the info obtained from the CTI events to decrypt the media and perform voice quality troubleshooting or call screening in real-time. The call control agent shares call information to the secure voice analysis device through the CTI interface.

Figure 1:
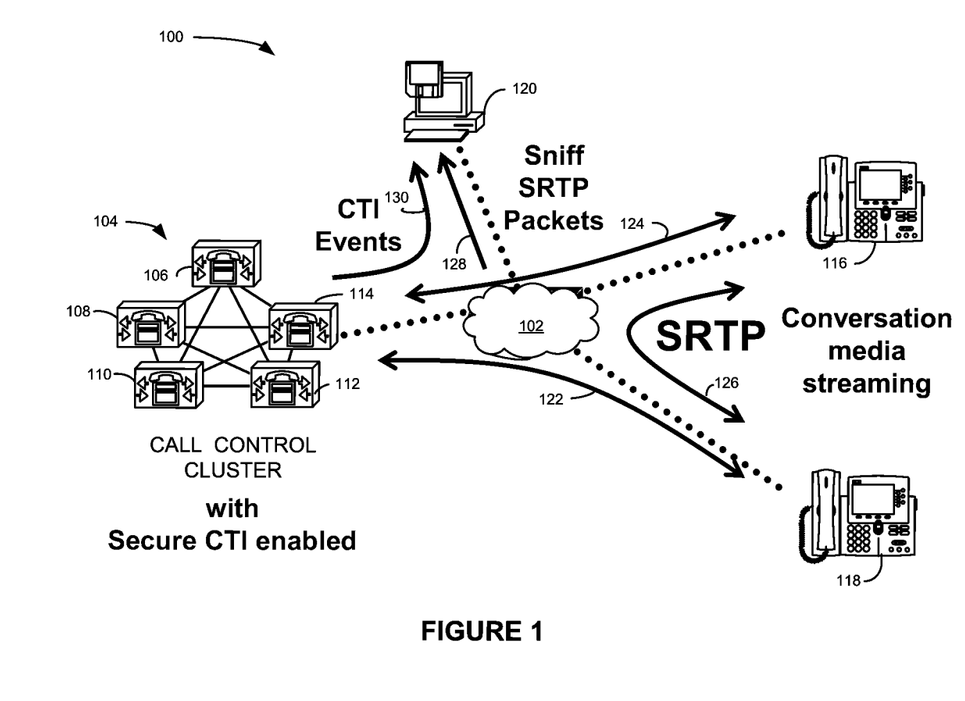
FIG. 1 illustrates an example of a system employing a secure voice analysis device.

FIG. 1 illustrates an example of a system employing a secure voice analysis device 120. Network 100 comprises a wide area network, local area network or a combination thereof 102 for coupling call control cluster 104 with endpoints (e.g. VoIP telephones) 116, 118 and call analysis device 120. As illustrated, call control cluster 104 comprises five call control agents 106, 108, 110, 112, 114; however, this is merely for ease of illustration as those skilled in the art can readily appreciate call control cluster 104 may comprise a single call control agent or as many call control agents as is realizable. Moreover, one or more of call control agents 106, 108, 110, 112 and 114 may provide a CTI interface.

When an endpoint (e.g. endpoint 116) initiates a call to another endpoint (e.g. endpoint 118), a secure path 124 is established between endpoint 116 and call control cluster 104 and another secure path 122 is established between call control cluster 104 and endpoint 118. Secure paths 122 and 124 enable the call control cluster to pass call control information, such as media keying material, to endpoints 116, 118 for establishing the call. The media keying material may include information pertaining to a master key, master key salt, algorithm identifier, and key derivation rate.

Endpoints 116, 118 use the call information to create a secure path 126 to communicate with each other. Path 126 is an encrypted media stream (for instance SRTP) between endpoints 116 and 118.

Figure 2:
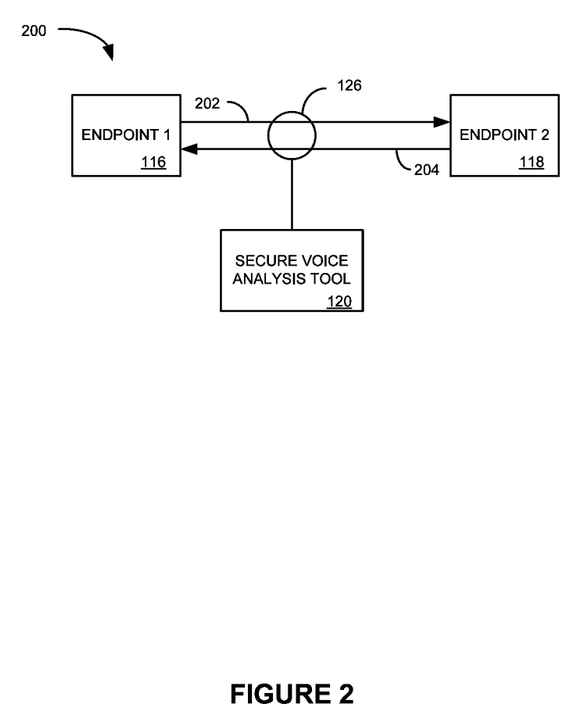
FIG. 2 illustrates an example of a VoIP stream.

However, as illustrated by the VoIP stream 200 in FIG. 2, instead of a bi-directional path, path 126 may comprise two unidireactional paths 202, 204. Therefore, when the key exchange is performed with call agent cluster 104, endpoint 116 receives a first key for unidireactional path 202, which is to encrypt data sent from endpoint 116 to endpoint 118, and a second key for unidireactional path 204 to decrypt data send from endpoint 118 to endpoint 116. Endpoint 118 receives the first key for decrypting data sent on unidireactional path 202 and the second key for encrypting data sent on path 204 to endpoint 116.

At this point, the secure voice analysis device, which has established an authenticated CTI connection with the call control agent, can receive info about the call in received CTI events, including but not limited to the media keying material for the secure call. The secure voice analysis device also sniffs the secure media between the endpoints, and can thus use the info obtained from the CTI events to decrypt the media and perform voice quality troubleshooting or call screening in real-time. The call control agent shares call information with the secure voice analysis device through the CTI interface. After establishing the session, call analysis device 120 can securely receive CTI information for the desired connection or endpoint. The secure session setup may entail exchanging session keys between call analysis device 120 and call control cluster 104 (or one or more call control agents in call manager cluster 104). Media keying material for the monitored call can then be encrypted and securely passed to call analysis device 120 using the session keys.

For example, to monitor path 126 between endpoints 116 and 118, CTI information is sent via path 130 from call control cluster 104 to call analysis device 120. The CTI information may suitably comprise call events and media information including keying material for SRTP encryption and decryption. Call analysis device 120 sniffs the secure media streams (e.g. SRTP packets) from path 126 through network 102 and correlates those packets with the CTI events and media keying information received from call control cluster 104. Encrypted conversations can now be played back and diagnosed in real-time. Furthermore, call analysis device 120 can use path 130 to keep monitoring CTI events for certain IP phones and turn on SRTP sniffing on-demand.

An aspect of call analysis device 120 is that a secure CTI interface is used to pass SRTP key material for SRTP stream decryption. Another aspect is that call analysis device 120 does not need to understand complex VoIP signaling protocols, and can instead use application programming interfaces (APIs) such as JTAPI (Java Telephony API or TAPI (Telephony Application Programming Interface).

Figure 3:
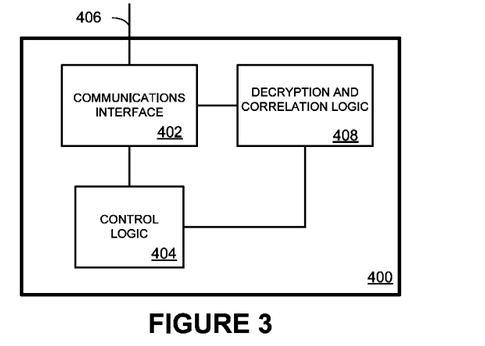
FIG. 3 illustrates an example of an apparatus for performing secure call analysis.

FIG. 3 illustrates an example of an apparatus 400 for performing secure call analysis and/or call monitoring. Apparatus 400 can be suitably adapted to perform the functionality of the voice analysis device 120 described in FIG. 1. Communications interface 402 is used for acquiring data on an associated network. Communications interface 402 is suitably adapted for performing any modulation, encoding digital to analog (D/A) conversion, frequency shifting or other functions for sending signals as well as any demodulation and decoding analog to digital (A/D) conversion, frequency shifting for receiving signals. For a wired network a coupler 406 can be employed for coupling communications interface 402 to the network. For a wireless interface, a coupler may not be needed.

The communications interface can be employed to monitor a connection between endpoints. For example, the communications interface 402 can be coupled to a switch to monitor packets with a specified source and/or destination address. Furthermore, communications interface 402 exchanges signals with a call control server (or call control cluster) for obtaining CTI data for the call and/or endpoint being monitored. In a preferred embodiment, the connection is a secure connection. The communications interface 402 can be coupled to a switch or any other suitably location within the network for performing the call analysis and monitoring functions described herein.

Decryption and correlation logic 408 is communicatively coupled to the communication interface. Decryption and correlation logic 408 is configured to correlate the computer telephony integration event received by communications interface 402 to a secure media packet received by communications interface 402 and to decrypt the secure media packet with keying material contained in the computer telephony integration event.

Control logic 404 is coupled to communication interface 402 and operable to control the operation of communication interface 402. Communication interface 402 is responsive to control logic 404 to exchange signals with a call control agent through a CTI connection (e.g. in call control cluster 104 in FIG. 1) to authenticate therewith. After authentication, a secure CTI channel is established between communications interface 402 and the call control agent.

In a preferred embodiment, the CTI connection between the call analysis device and the call control agent is secure. A session key is received during the CTI connection establishment for decrypting signals from the call control agent. The session key can be used to decrypt a CTI event to obtain the media keying material contained in the CTI event for the call and/or endpoint being monitored. The media keying material may include information pertaining to a master key, master key salt, algorithm identifier, and key derivation rate.

A call being monitored can comprise a first stream encrypted by a first key and a second stream encrypted by a second key. The keys are derived from keying material contained in CTI events received by communications interface 402. Control logic 404 then passes the CTI event, including media keying material (e.g. first and second keys or material for deriving the first and second keys) to decryption and correlation logic 408 to use for decrypting. Decryption and correlation logic 408 is configured to correlate the computer telephony integration event for the first stream to a secure media packet for the first stream and to correlate a computer telephony integration event for the second stream with the second stream.

For calls and/or endpoints having a key derivation rate, communications interface 402 receives telephone integration events with new keying material corresponding to the key derivation rate. The new keying material is forwarded to decryption and correlation logic 408. Decryption and correlation logic 408 is responsive to receiving the new keying material to correlate the computer integration events with new keying material to corresponding secure media packets and to decrypt the corresponding secure media packets employing the new keying material.

Transport layer security (TLS) security connections are established between apparatus 400 and the call control server (e.g. call control cluster 104 in FIG. 1) and the endpoints (e.g. endpoints 116, 118) being monitored. For example, a first secure TLS connection is established between the communication interface 402 and a call control agent through CTI for receiving telephone integration events. A second secure TLS connection is established between call control cluster and the endpoints. This is to protect the call from being monitored.

An aspect of apparatus 400 is that a secure CTI interface provides a secure connection between a call control agent and apparatus 400 for receiving media keying material for the call being monitored (e.g. SRTP media keying material). Moreover, apparatus 400 doesn't need to understand complex VoIP signaling protocols in order to function, but can instead use application program interfaces, such as JTAPI or TAPI. Monitoring can be accomplished without changes that can make the user aware monitoring is occurring, such as clicking noises.

Figure 4:
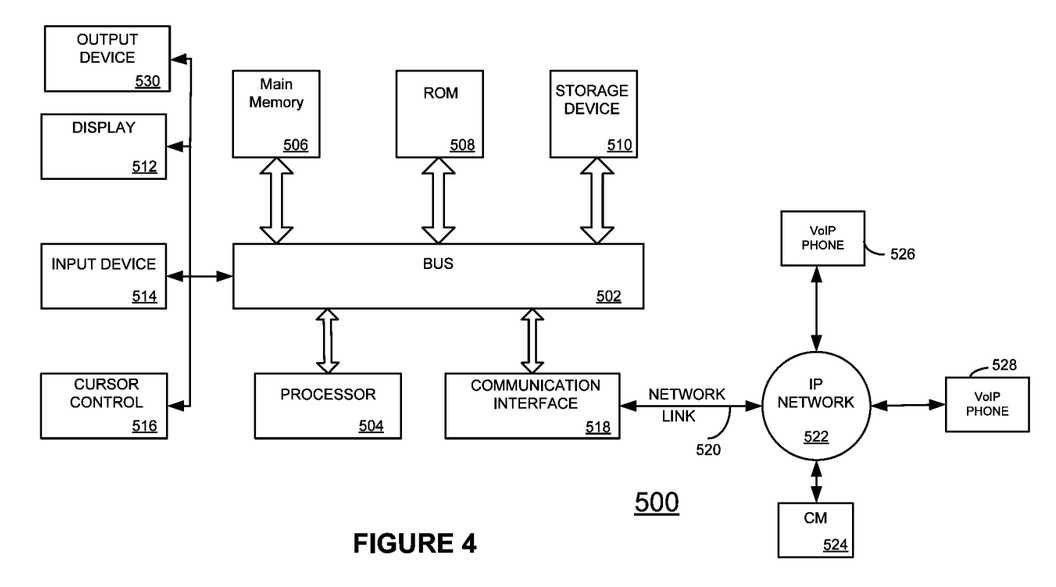
FIG. 4 illustrates an example of a computer system for implementing an aspect of the present invention.

FIG. 4 illustrates an example that illustrates a computer system 500 upon which an embodiment of the invention may be implemented. Computer system 500 is suitable to perform the functionality of call analysis device 120 described in FIG. 1 and/or for performing the functionality of control logic (404) and/or decryption and call analysis logic 408 described in FIG. 3.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 such as a cathode ray tube (CRT) or liquid crystal display (LCD), for displaying information to a computer user. An output device 530 can also be coupled to bus 502 for outputting audio signals.

An input device 514, such as a keyboard including alphanumeric and other keys is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g. x) and a second axis (e.g. y) that allows the device to specify positions in a plane.

An aspect of the invention is related to the use of computer system 500 for secure call analysis and screening of a secure connection. According to one embodiment of the invention, secure call analysis and screening of a secure connection is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through IP network 522 to a Call Control Agent 524, and call, or stream endpoints such as VoIP phone 526. IP network 522 and Internet uses electrical, electromagnetic, or optical signals that carry the digital data to and from computer system 500.

Figure 5:
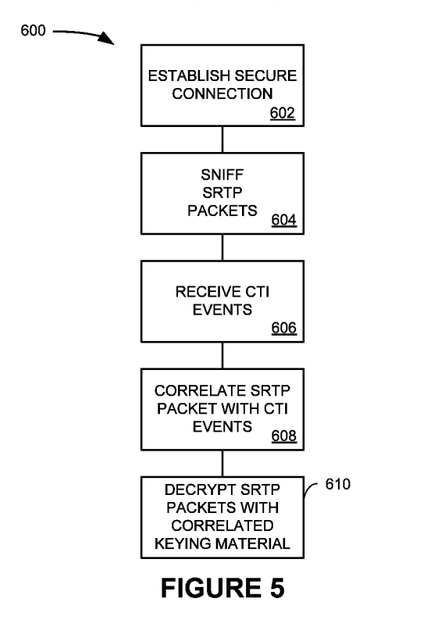
FIG. 5 illustrates an example of a methodology for secure call analysis.

In view of the foregoing structural and functional features described above, a methodology in accordance with various aspects of the present invention will be better appreciated with reference to FIG. 5. While, for purposes of simplicity of explanation, methodology 600 of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement methodology 600 in hardware, software, or a combination thereof.

At 602, a secure connection is established between the call analysis/monitoring device and a CTI device (e.g. a call control server with a CTI interface). In a preferred embodiment, a TLS session is initiated. Keying material is exchanged between the call analysis device and the call control server through a secure CTI connection. This enables data to be exchanged between the call analysis/monitoring device securely. For example, the call control server can securely send media keying material to the call analysis/monitoring device.

At 604, packets are sniffed from the network. In a preferred embodiment, media packets (e.g. SRTP packets) are sniffed at any location interstitial to the endpoints of the call. For example, a call analysis device can be coupled to a switch that is communicatively coupled to one of the endpoints of the call. In a preferred embodiment, packet headers can be examined and packets with the desired source/destination address are examined. A copy of the packet can be downloaded to the device, allowing the original packet to be delivered without interruption, or the packet can be forwarded to the device, and subsequently forwarded after analysis.

At 606, CTI events for the call (or traffic to an endpoint) are received. In a preferred embodiment, the CTI traffic is encrypted and sent over the secure connection established at 602. The CTI packets are then decrypted employing keying material derived from when the secure session was established (e.g. derived from a session key established for the session). For example, for SRTP packets, the keying material for the SRTP packet is obtained by decrypting CTI events.

At 608, the media packets sniffed from the network (e.g. SRTP packets for a VoIP call) are correlated with the CTI events. For an SRTP packet, this enables the appropriate SRTP keying material to be correlated with the appropriate SRTP packets.

At 610, the media packets are decrypted with the correlated keying material from the CTI event.

In embodiments where the call comprises two or more separate media streams (e.g. as described in FIG. 2 a VoIP call endpoints can encrypt packets with different keying material), steps 604, 606, 608, 610 can be performed separately for each stream. For example, referring again to FIG. 2, if endpoint 116 employs a first key and endpoint 2 118 employs a second key, packets from both endpoint 116 and endpoint 118 can be sniffed, CTI events for endpoints 116 and 118 can be sent via the same secure connection established at 602 (or alternatively separate secure channels can be established for each endpoint). The CTI events for endpoint 116 are correlated with packets for endpoint 116 and CTI events for endpoint 118 are correlated with packets for endpoint 118, enabling packets to be decrypted with the appropriate keying material.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a communication interface operable to communicate with an associated call control agent associated with a call control server,
   wherein the call control agent is operable to communicate, via the communication interface, media keying material to at least first and second communication endpoints to establish a secure, bidirectional real-time voice communication session between the communication endpoints; and
   decryption and correlation logic associated with a voice analysis device communicatively coupled with the communication interface,
   wherein the decryption and correlation logic is operable to pre-establish an authenticated connection with the call control agent,
   wherein the decryption and correlation logic obtains, via the communication interface, computer telephony integration events from the call control agent, wherein the computer telephony integration events comprise communication of the media keying material from the call control agent to the voice analysis device, and wherein the communication interface receives telephone integration events with new media keying material according to a key derivation rate,
   wherein the decryption and correlation logic is responsive to correlate the computer integration events with the new keying material to corresponding secure media packets and to decrypt the corresponding secure media packets employing the new media keying material,
   wherein a first secure transport layer security connection is established between the communication interface and a call control agent through a computer telephony integration connection for receiving the computing telephony integration events,
   wherein a second secure transport layer security connection is established between the communication endpoints,
   wherein a session key is received into the decryption and correlation logic from the associated call control agent, in accordance with a pre-established authenticated connection, through the secure computer telephony integration channel for decrypting signals from the associated call control agent;

wherein the decryption and correlation logic sniffs via the communication interface a secure media packet sent from the first endpoint to the second endpoint, wherein the decryption and correlation logic sniffs via the communication interface a secure media packet sent from the second endpoint to the first endpoint, wherein the decryption and correlation logic correlates the computer telephony integration events with the secure media packet sent from the first endpoint to the second endpoint and decrypts the secure media packet with the keying material from the correlated computer telephony events in accordance with the received session key, and wherein the decryption and correlation logic correlates the computer telephony integration events with the secure media packet sent from the second endpoint to the first endpoint and decrypts the secure media packet with the keying material from the correlated computer telephony events; and control logic coupled to the communication interface and operable to control the operation of the communication interface, wherein the control logic performs voice quality troubleshooting for the real-time voice communication session occurring between the first and second communication endpoints by evaluating the decrypted secure media packets.

2. The apparatus according to claim 1, wherein the communication interface is responsive to the control logic to exchange signals with the associated call control agent through a computer telephony integration connection to authenticate with the associated call control agent; and
wherein a secure computer telephony integration channel is established between the communications interface and the call control agent.

3. The apparatus according to claim 1, wherein session key is used to decrypt the computer telephony integration events to obtain the media keying contained in the computer telephony integration events.

4. The apparatus according to claim 1, wherein the real-time voice communication session comprises a first stream encrypted by a first key and a second stream encrypted by a second key; and
wherein the decryption and correlation logic is configured to correlate computer telephony integration events for the first stream to a secure media packet for the first stream and to correlate computer telephony integration events for the second stream with the second stream.

5. The apparatus according to claim 1, wherein the secure media packet is a secure real-time protocol packet;
wherein the media keying material contained in the computer telephony integration events decrypts the payload of the packet.

6. An apparatus according to claim 1, wherein secure communication is between a first endpoint and a second endpoint; and
wherein the communication interface acquires the secure media packet from a switch disposed between the first endpoint and the second endpoint.

7. A method, comprising:
receiving, into a voice analysis device from a call control agent, computer telephony integration events for a plurality of secure telephone calls, each between at least a first endpoint and a second endpoint, wherein the computer telephony integration events comprise unique media keying data associated with each secure telephone call;
establishing a trusted relationship between the call control agent and the voice analysis device;
receiving, into the voice analysis device from an associated call control agent associated with a call control server, media keying material used in connection with correlated computer telephony events including secure connections between multiple instances of at least first and second communication endpoints, wherein the media keying material comprises a key derivation rate, and wherein the computer telephony integration events include new keying material corresponding to the key derivation rate;
sniffing, via the voice analysis device, secure media packets for each secure call sent by the first endpoint to the second endpoint in accordance with media keying data corresponding thereto;
sniffing, via the voice analysis device, secure packets for each secure call sent by each associated second endpoint to each associated first endpoint in accordance with corresponding media keying data;
correlating, via the voice analysis device, the computer telephony integration events to an associated plurality of sniffed secure media packets;
decrypting, via the voice analysis device, secure media packets with the media keying data from the correlated computer telephony integration events; and
performing voice quality troubleshooting for at least a first one of the plurality of secure telephone calls by evaluating the plurality of decrypted secure media packets associated with the first secure telephone call;
wherein a first secure transport layer security connection is established for receiving the computer telephony integration events; and
wherein a second secure transport layer security connection is established between the first and second endpoints.

8. The method according to claim 7, further comprising:
receiving a session key for the secure computer telephony integration channel with the associated call control agent; and
employing the session key for retrieving the media keying material from computer telephony integration events provided by the associated call control agent for decrypting the plurality of secure media packets.

9. The method according to claim 7, wherein the secure stream comprises a first stream sent by the first associated endpoint encrypted using a first keying material and a second stream sent by the second associated endpoint encrypted using a second keying material.

10. The method according to claim 7, wherein the call comprises a first stream encrypted by a first key and a second stream encrypted by a second key, further comprising:
the receiving computer telephony integration events for a secure stream comprising a plurality of packets comprises first keying material and second keying material; and
the correlating the computer telephony integration events correlates the first stream to the first keying material and the second stream to the second keying material.

11. The method of claim 7, wherein the sniffing comprises sniffing the secure media packets while the packets are en route between the associated first and second endpoints.

12. An apparatus, comprising:
a voice analysis device including means for sniffing a plurality of secure voice over internet protocol (VoIP) calls between a respective plurality of associated first and second endpoints of each respective secure call to acquire at least one secure media packet for each secure call while the secure media packet is en route between each associated first and second endpoints of the secure call;

logic operable to pre-establish an authenticated connection with between the voice analysis device and an associated call control agent;

the voice analysis device including means for receiving, from the associated call control agent of a call control server communicating secure media packet between first and second associated endpoints, a computer telephony integration event for each secure call, wherein the computer telephony integration event comprises media keying material uniquely associated with each secure call, wherein the keying material comprises a key derivation rate and wherein the computer telephony integration event includes new keying material that corresponds to the key derivation rate;

the voice analysis device including means for receiving, from the associated call control agent, unique keying material associated with each communication between each associated first and second endpoints;

means for correlating each computer telephony integration event to an associated secure media packet acquired by the sniffing;

means for decrypting secure media packets with associated keying material contained in correlated telephone integration events; and means for performing voice quality troubleshooting for at least a first one of the plurality of secure VoIP telephone calls by evaluating the decrypted secure media packets associated with the first VoIP secure telephone call, wherein a first secure transport layer security connection is established for receiving each computer telephony integration event; and wherein a second secure transport layer security connection is established between the first and second endpoints.

13. The apparatus according to claim 12, the means for receiving a computer telephony integration event further comprising means for establishing a secure computer telephony integration connection with the associated call control agent.

14. The apparatus according to claim 13, further comprising means for receiving a session key from the associated call control agent for decrypting signals from the associated call control agent.

15. The apparatus according to claim 14, wherein means for decrypting the computer telephony integration event to obtain the media keying material contained in the computer telephony integration event employing the session key.

* * * * *